United States Patent
Green

(10) Patent No.: US 11,141,996 B2
(45) Date of Patent: Oct. 12, 2021

(54) MESSAGE SELECTION FOR A PRINTER

(71) Applicant: Linx Printing Technologies Ltd., St. Ives (GB)

(72) Inventor: John Green, St. Ives (GB)

(73) Assignee: LINX PRINTING TECHNOLOGIES LTD., St. Ives (GB)

( * ) Notice: Subject to any disclaimer, the term of this patent is extended or adjusted under 35 U.S.C. 154(b) by 0 days.

(21) Appl. No.: 16/301,837

(22) PCT Filed: May 19, 2017

(86) PCT No.: PCT/GB2017/051396
§ 371 (c)(1),
(2) Date: Nov. 15, 2018

(87) PCT Pub. No.: WO2017/203213
PCT Pub. Date: Nov. 30, 2017

(65) Prior Publication Data
US 2019/0168903 A1    Jun. 6, 2019

(30) Foreign Application Priority Data

May 25, 2016    (GB) .................................... 1609189

(51) Int. Cl.
*B41J 3/407*    (2006.01)
*B41J 5/00*    (2006.01)
(Continued)

(52) U.S. Cl.
CPC .......... *B41J 3/4075* (2013.01); *B41J 3/4073* (2013.01); *B41J 3/40733* (2020.08); *B41J 3/46* (2013.01);
(Continued)

(58) Field of Classification Search
None
See application file for complete search history.

(56) References Cited

U.S. PATENT DOCUMENTS

| 7,819,489 B2 | 10/2010 | Gambino et al. |
| 2002/0033959 A1* | 3/2002 | Ando ................. H04N 1/00143 358/1.13 |

(Continued)

FOREIGN PATENT DOCUMENTS

| JP | 2001075747 | 3/2001 |
| JP | 2006330996 A | 12/2006 |

(Continued)

OTHER PUBLICATIONS

GB Application No. GB1609189.4 Search Report dated Nov. 25, 2016, 4 pages.

(Continued)

*Primary Examiner* — Henok D Legesse
(74) *Attorney, Agent, or Firm* — Lathrop GPM LLP

(57) ABSTRACT

Either during message selection in an industrial printer (e.g. ink jet or laser marking) for printing onto objects carried past it on a conveyor, or during printing, or both, a printer displays an image associated with the message proposed for printing or being printed. The image may be a picture (e.g. a photograph) of the object on which the message should be printed or the intended customer/end user or the intended use of the object on which the message should be printed. Since a human operator can usually identify an object or intended customer/use more quickly and accurately from a picture than from text, this reduces errors in message selection and/or helps the detection of an incorrect message during printing. The image may be displayed with the associated message or without it.

22 Claims, 10 Drawing Sheets

(51) Int. Cl.
*B41J 3/46* (2006.01)
*B65B 61/02* (2006.01)
*H04N 1/00* (2006.01)
*H04N 1/32* (2006.01)

(52) U.S. Cl.
CPC ............... *B41J 5/00* (2013.01); *B65B 61/025* (2013.01); *H04N 1/0044* (2013.01); *H04N 1/32128* (2013.01)

(56) References Cited

U.S. PATENT DOCUMENTS

| 2002/0054279 | A1 | 5/2002 | Hoshino et al. |
| 2006/0204144 | A1 | 9/2006 | Fujiwara et al. |
| 2006/0287974 | A1 | 12/2006 | Mochizuki et al. |
| 2007/0103721 | A1 | 5/2007 | Yokoyama |
| 2008/0239384 | A1 | 10/2008 | Kadota |
| 2009/0086280 | A1 | 4/2009 | Nojiri |
| 2012/0243039 | A1 | 9/2012 | Miyata et al. |

FOREIGN PATENT DOCUMENTS

| JP | 2009104527 | 5/2009 |
| JP | 2016004379 | 1/2016 |
| KR | 20060131554 | 12/2006 |
| WO | 2010021097 | 2/2010 |
| WO | 20110110609 | 9/2011 |

OTHER PUBLICATIONS

GB Application No. GB1609189.4 Search Report dated Aug. 1, 2017, 2 pages.
PCT Application No. PCT/GB2017/051396 International Search Report dated Aug. 24, 2017, 3 pages.
GB Application No. GB1609189.4 Examination Report dated Jan. 23, 2018, 3 pages.

* cited by examiner

Figure 8a
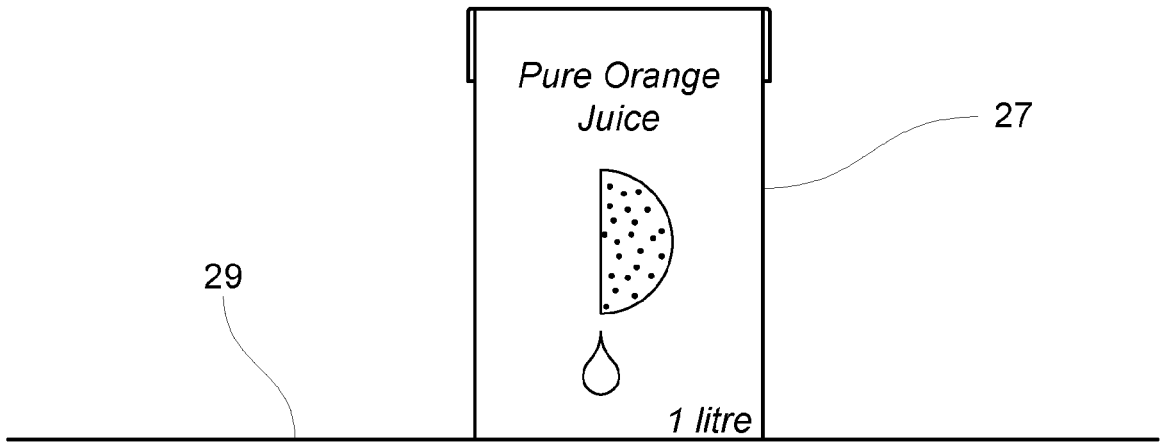
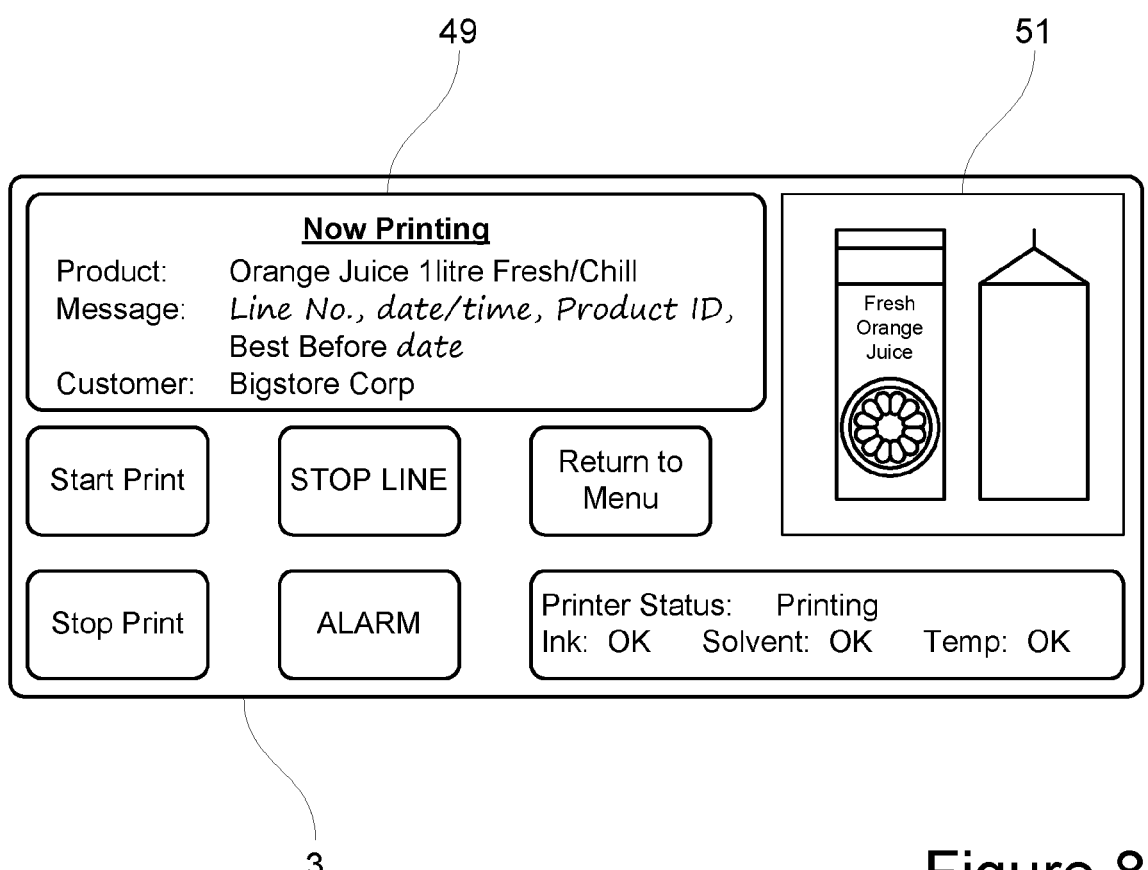
Figure 8b

MESSAGE SELECTION FOR A PRINTER

TECHNICAL FIELD

The present invention relates to a printer operable to print a message or other printed pattern onto a succession of objects, or to print repeatedly onto single long object, and to a method of selecting or verifying the message or other pattern being printed. The invention may be used particularly with non-impact printers such as ink jet printers and laser markers (i.e. printers that print by directing a laser beam at an object to be printed onto so as to mark the object by changing a surface characteristic of the object). Such printers may be used to print onto a wide variety of objects and the type of object being printed onto may be altered from time to time.

BACKGROUND

Non-impact printers such as ink jet printers and laser markers are used on industrial packing lines, filling lines and other types of line, which carry products or other objects past the printer while the printer prints onto the objects. For example, a food or drink filling line may fill containers with food or drink and seal them, and then convey the sealed containers past the printer which prints data onto each sealed container such as product line information required for product traceability, packing time and date, "best before" date and other codes such as batch numbers and product type identifications.

Typically a filling, packing or other type of product conveying line will handle different products at different times. Typically, the data to be printed on a product will vary depending on the nature of the product. For example, any product identification codes will vary depending on the nature of the product and additionally different products have different shelf lives and therefore the calculation of the correct "best before" date depends on the identity of the product in question. Additionally, a line may be used for filling or packaging products for different customers (for example different chains of stores or different distributors) or products intended for different uses at different times, and each customer or intended use may have its own rules for the information to be printed on a product and the layout of that information in the overall printed pattern. If the printer is set up incorrectly, so that it prints data relating to the wrong product or according to the rules for the wrong customer or use, every product will be mislabelled. Since the customer will typically reject mislabelled products, and it may even be illegal to place such products on the market in some circumstances, such products may be unsaleable. Consequently, such a printing error can be very expensive for the operator of the packing or filling line concerned.

SUMMARY

Aspects of the present invention allow the display of an image associated with the printed pattern, for example an image showing an example of the product to be printed onto or an image identifying the customer or other person or organisation associated with the product or an intended use for the product, and the operator can use this image as an aid in selecting the correct pattern to be printed or to verify, during printing operation, that the correct pattern is being printed.

In a typical embodiment of the present invention the printer is usable for printing onto an object that is carried on a packing, filling or other product conveying line. Normally the objects are carried past a print head by a conveyor that is external to the printer. Although the objects on the conveyor might be flat sheets, the printer is not limited to printing onto flat sheets. In these ways, the printer differs from a typical sheet printer, such as is used for printing text and images output from a computer onto sheets of paper or similar material.

In the embodiments the image is not derived from the pattern to be printed. The image is not necessarily an image of the pattern is to be printed or of any part of the pattern to be printed. In this way, it differs from a "thumbnail" image which shows what will be printed. In the embodiments, the image typically shows the object to be printed onto or an identification of a customer, brand or end user for whom the image is being printed.

An aspect of the present invention provides a printer comprising a memory storing a plurality of data entries, a display, a print system and a control system, the memory additionally storing a plurality of images and at least some of the data entries being associated with at least some of the images, and a control system responding, in a first mode of operation of printer, to an input identifying one or more of the data entries as a candidate for selection by displaying an image associated with an identified data entry on the display and responding to a subsequent selection of a data entry by controlling the print system to print a pattern determined, at least in part, by the data entry.

Another aspect of the present invention provides a printer having a display, a memory storing a plurality of data entries and a plurality of images, at least some of the data entries being associated with one or more of the images, a print system and a control system, the printer having a mode of operation in which the control system controls the print system to print a pattern specified at least in part by the data in a selected one of the data entries, and the control system displaying on the display an image associated with the selected data entry.

Another aspect of the present invention provides a method of selecting a pattern to be printed comprising responding to the identification of one or more data sets as candidates by displaying, in respect of one or more identified data sets, a stored image included in or associated with the data set, and responding to a subsequent selection of a data set by generating a pattern to be printed in accordance with data in the selected data set.

A further aspect of the present invention provides a method of enabling an operator to verify a pattern printed by a printer in which the printer generates a pattern to be printed in accordance with data from at least one data set, and the printer displays at least one image stored in or in association with at least one data set used to determine the pattern being printed.

The printer may be used to print onto product items (or to print repeatedly onto a single long product item) conveyed past the printer by a conveying system or an industrial line such as a filling line or a packaging line. The printer may be a non-impact printer. It may be an ink jet printer or a laser marker.

The data set may comprise a data entry containing data for specifying at least in part the pattern to be printed onto a predetermined product or product type and the image or images associated with the data set may be an image or images (for example photographs) of an example of the product or product type. The data in the data entry may specify, at least in part, the pattern to be printed onto products related to a particular person or organisation, or products intended for a particular use, and the associated image or images may be indicative of the person or organisation concerned or the use concerned, for example the image may be of a corporate symbol or logo or an image illustrating the intended use or field of use. The data in the data entry may be specific both to a particular product and to a particular person or organisation or intended use, and may be associated both with an image relating to the product and an image relating to the person or organisation or intended use. The person or organisation may, for example, be a customer of the business operating the printer. The person or organisation may, for example, be a distributor or retailer.

Each data entry may be part of a data set and the image may be associated with a data entry by being included in the corresponding data set. Alternatively, a data set may include a data entry together with a reference or identity for an associated image or a reference or identity for something that is in turn associated with the image such as a product or product type or a person or organisation or intended use, and images may be stored separately in association with the corresponding reference or identity data. This can provide a more efficient use of memory if a single image is associated with more than one data entry.

The image may be displayed on its own or in combination data from the associated data entry or a representation of the pattern to be printed in accordance with the associated data entry.

Since the patterns to be printed on product items are typically composed entirely or largely of text, and the correct pattern to be printed may be only slightly different in appearance from an incorrect pattern, it can be difficult for an operator to distinguish between the correct pattern and an incorrect pattern and accordingly it may be difficult for an operator to notice that a mistake has been made in selecting the correct data entry to define the pattern to be printed. For example, an operator may accidentally cause the printer to print a pattern for a different but related product from the product actually being printed onto. For example, where a particular food stuff is made with multiple flavours, data relating to one flavour may be printed on the packaging for a different flavour. Where a product is supplied to more than one different person or organisation the data for that product as required by one person or organisation may be printed onto items of that product intended to be delivered to a different person or organisation. Where a product can be used in different ways or in different circumstances, data (e.g. regulatory or advisory data) for that product when is intended for a particular use may be printed onto items of the same product but intended for a different use.

However, even closely related products will typically have a different appearance from each other, for example by having different colour packaging or a different design or picture. Different businesses and organisations can usually be identified readily from corporate logos and other images. Different uses can often be distinguished by different symbols or other images. Consequently, a human operator may more readily realise that an error has been made, or may be more likely to select the correct data entry in the first place, if an appropriate image is presented to the operator on the display of the printer. For example, if the operator can see that products with yellow packaging are being conveyed along the product line past the printer whereas the printer display shows a similar product with red packaging, the operator will immediately understand that the printer has been set up incorrectly.

An aspect of the present invention provides a printer having a print head operable to print a predefined pattern onto an object that is conveyed past the print head, the printer further comprising a display, a user input device, and a memory storing a plurality of pattern data entries each defining, alone or in combination with further data, the pattern to be printed onto an object, the memory further storing a plurality of images, wherein at least some of said pattern data entries are associated in the memory with at least one said image, and the printer has a print selection mode of operation in which the user is able to select a pattern data entry to define at least in part a pattern to be printed during a subsequent print operation, and (i) in the case that the selected pattern data entry is associated with at least one image, said associated image or at least one of said associated images is displayed on the said display following selection by the user, and/or (ii) in the case that the user is able to select the pattern data entry from a plurality of candidate pattern data entries at least some of which are associated with respective images, at least one image associated with a candidate pattern data entry is displayed on the said display during the print selection mode of operation prior to the selection by the user.

An aspect of the present invention provides a printer having a print head operable to print a predefined pattern onto an object that is conveyed past the print head, the printer further comprising a display, a user input device, and a memory storing a plurality of pattern data entries each defining, alone or in combination with further data, the pattern to be printed onto an object, the memory further storing a plurality of images, wherein at least some of said pattern data entries are associated in the memory with at least one said image, and the printer has a printing mode of operation in which the printer repeatedly performs a print sequence in which it prints a predefined pattern onto an object conveyed past the print head, the predefined pattern printed in each said print sequence being defined at least in part by a common said pattern data entry, and in which an image associated with the common said pattern data entry is displayed on the said display during the print operation.

An aspect of the present invention provides a printer having a database, a display screen, a print system and a control system, the database storing a plurality of pattern data entries that define, at least in part, a pattern to be printed by the print system and the database additionally storing, in respect of at least some of said pattern data entries, an image associated with the pattern data entry, and the control system responding to one of: (a) a print operation in which the print system prints a pattern defined at least in part by a selected one of said pattern data entries, (b) a selection input that selects one of said pattern data entries for use in defining the pattern to be printed by the print system, and (c) a selection input that selects one of said pattern data entries in a context permitting the selected pattern data entry to be chosen for defining at least in part the pattern to be printed by the print system, by displaying an image stored in association with the selected pattern data entry.

An aspect of the present invention provides a method of printing comprising a step of selecting a pattern data entry stored in a database, the pattern data entry comprising data defining, at least in part, a pattern to be printed onto an object, and a step of printing a pattern defined at least in part by the data of the selected pattern data entry, the method further comprising displaying, during at least one of said selecting step and said printing step, an image stored in the database, the said image being associated in the database with the selected pattern data entry.

In an aspect of the present invention, an industrial printer (e.g. ink jet or laser marking) for printing onto objects carried past it on a conveyor displays, either during message selection or during printing, or both, an image associated with the message proposed for printing or being printed. The image may be a picture (e.g. a photograph) of the object on which the message should be printed or the intended customer/end user or the intended use of the object on which the message should be printed. Since a human operator can usually identify an object or intended customer/use more quickly and accurately from a picture than from text, this reduces errors in message selection and/or helps the detection of an incorrect message during printing. The image may be displayed with the associated message or without it.

In the embodiments, the image that is associated with message or pattern data is displayed to help the operator to select which message or pattern data to use, or to verify that the correct message or pattern is being printed. It is not itself used by the printer to define the pattern to be printed. In the embodiments there is no connection in the operation of the printer between image data of the image and the pattern to be printed.

Typically the printed pattern will comprise text, and will usually be mostly or entirely text, and can be regarded as a message. The image is usually a symbol or a picture, and may be a graphical image or a photograph.

The objects usually move past the printer continuously. However, this is not essential and the movement may be intermittent. For example, a printer may be set up to print downwards onto the objects from above and a print head may print while traversing over the objects in a direction transverse to the direction of movement of the objects. In this case, the objects may be stationary during the printing operation and be moved between printing operations so as to bring a fresh object (or set of objects) into the printing position. Such a pattern of movement may be used, for example, for printing onto the tops of pots of food or drink (e.g. yoghurt) that are conveyed past the printer with two or more objects next to each other in the direction across the conveyor.

The printer will normally be able to print onto a variety of objects having a range of heights, lengths and widths, and it will normally be an industrial non-impact printer. The printer may be an ink jet printer such as a continuous ink jet printer. A continuous ink jet printer usually comprises means for deflecting the drops in flight, so that different drops can travel to different destinations. Typically, the ink is electrically conductive when wet, and the printer comprises an arrangement of electrodes to trap electric charges on the ink drops and create electrostatic fields in order to deflect the charged drops.

Normally, the ink jet printer has a print head that is separate from the main printer body and is connected to the main printer body by a flexible connector sometimes known as a conduit or umbilical that carries fluid and electrical connections between the print head and the main printer body. The print head includes an ink gun that receives pressurised ink and allows it to exit through an orifice to form a jet of ink, a charge electrode for trapping electric charges on drops of ink, deflection electrodes for creating an electrostatic field for deflecting charged drops of ink, and a gutter for collecting drops of ink that are not used for printing. The umbilical will include fluid lines, for example for providing pressurised ink to the ink gun and for applying suction to the gutter and transporting ink from the gutter back to the main printer body, and electrical lines, for example to provide a drive signal to a piezoelectric crystal or the like for imposing pressure vibrations on the ink jet, to provide electrical connections for the charge electrode and the deflection electrodes, and to provide drive currents for any valves that may be included in the print head.

The printer may comprise a camera, mounted for example on the print head, as a means for taking photographs of objects conveyed past it. This may be convenient for taking photographs to be stored as images to be displayed by the printer.

Further aspects and optional features of the present invention are set out in the accompanying claims.

BRIEF DESCRIPTION OF THE DRAWINGS

Embodiments of the present invention, given by way of non-limiting example, will now be described with reference to the accompanying drawings.

FIG. 8a shows a product on a conveyor, to be printed onto, and FIG. 8b shows an example of the display on a screen of the ink jet printer while printing onto the product shown in FIG. 8a.

DETAILED DESCRIPTION

The embodiments of the present invention use an ink jet printer. The ink jet printer may be a continuous ink jet printer such as an electrostatic deflection continuous ink jet printer.

Figure 1:
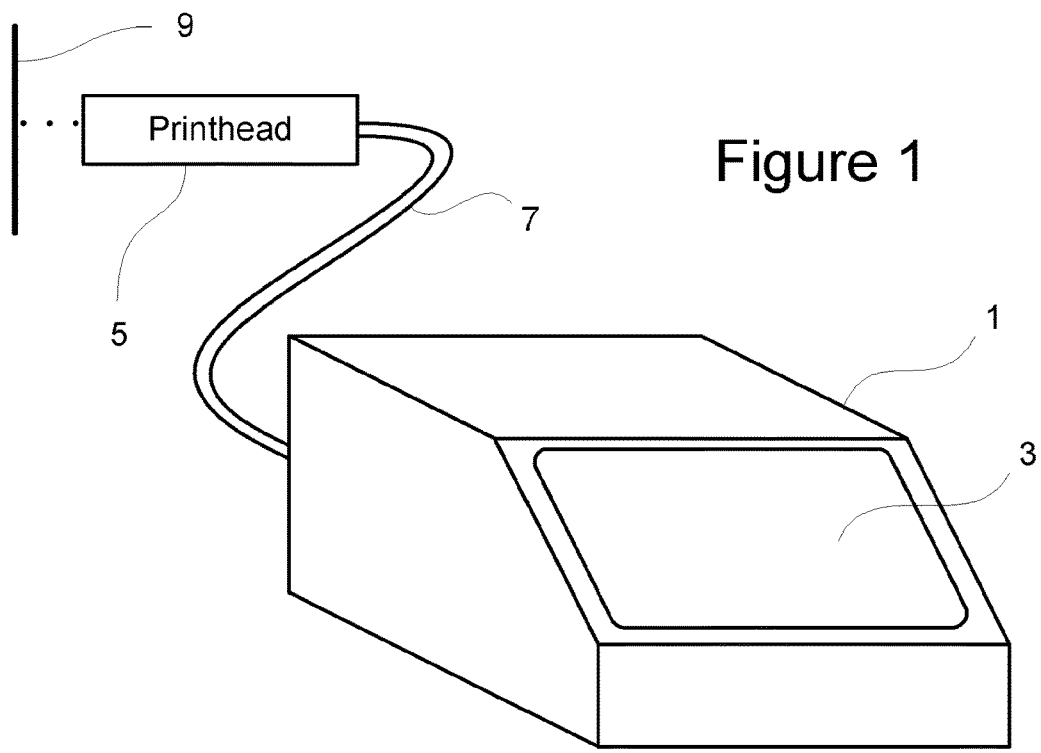
FIG. 1 shows an ink jet printer embodying the present invention.

FIG. 1 shows an electrostatic deflection type continuous inkjet printer. The printer forms a continuous jet of ink and has an arrangement of electrodes for charging drops of ink and deflecting the drops electrostatically in order to print a desired pattern. The main fluid and electrical components are housed within a main printer body 1. An operator communicates with the printer via a touchscreen display 3. The ink jet is formed within a print head 5, which also includes the electrode arrangement for charging and deflecting the ink drops, and the print head 5 is connected to the main printer body 1 by a flexible connection 7 known as a conduit or an umbilical. Drops of ink, deflected as necessary to create the desired pattern, travel from the print head 5 and strike the surface 9 of an object conveyed past the print head 5, in order to print the desired pattern on the surface 9 of the object.

Figure 2:
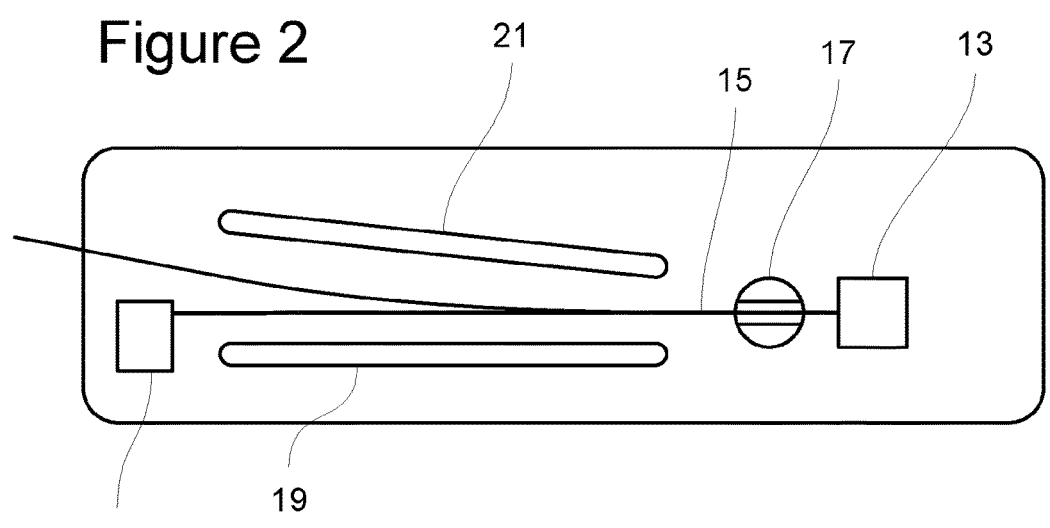
FIG. 2 is a schematic top view of the print head of the printer of FIG. 1.
Figure 3:
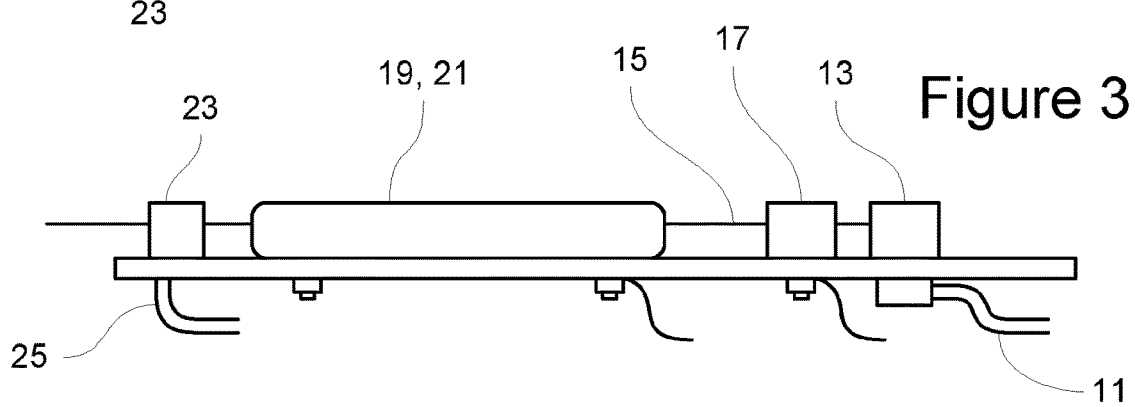
FIG. 3 is a schematic side view of the print head of the printer of FIG. 1.

FIG. 2 is a schematic top view and FIG. 3 is a schematic side view of the main components of the print head 5. Pressurised ink, delivered from the main printer body 1 through the umbilical 7, is provided via an ink feed line 11 to an ink gun 13. The pressurised ink leaves the ink gun 13 through a small jet-forming orifice to form an ink jet 15. Provided that pressurised ink is received by the ink gun 13 and any valves in the ink gun 13 are in the appropriate state, the ink jet 15 is formed continuously. Accordingly, this type of ink jet printer is known as a continuous ink jet printer, by contrast with a drop-on-demand printer in which a drop of ink is ejected only when a dot is to be printed.

Although the ink jet 15 leaves the ink gun 13 as a continuous unbroken stream of ink, it rapidly breaks into separate drops. The path of the ink jet passes through a slot in a charge electrode 17, which is positioned so that the ink jet 15 separates into drops while it is in the slot through the charge electrode 17. The ink is electrically conductive and the ink gun 13 is held at a constant voltage (typically ground). Accordingly, any voltage applied to the charge electrode 17 induces a charge into the part of the ink jet 15 that is in the slot of the charge electrode 17. As the ink jet 15 separates into drops, any such charge is trapped on the drops. Accordingly, the amount of charge trapped on each drop can be controlled by changing the voltage on the charge electrode 17.

The ink jet 15 then passes between two deflection electrodes 19, 21. A large potential difference (typically several kilovolts) is applied between those electrodes 19, 21 to provide a strong electric field between them. Accordingly, the drops of ink are deflected by the electric field and the amount of deflection depends on the amount of charge trapped on each drop. In this way, each ink drop can be steered into a selected path. As shown in FIG. 2, uncharged ink drops, which pass through the electric field without deflection, travel to a gutter 23 where they are caught. Suction is applied to the inside of the gutter 23 by a suction line 25, and so the ink received by the gutter 23 is sucked away and returned through the umbilical 7 to the main printer body 1, for reuse.

Drops of ink that are deflected by the field between the deflection electrodes 19, 21, so as to miss the gutter 23, leave the print head 5 and form printed dots on the surface 9 of the object.

Figure 4:
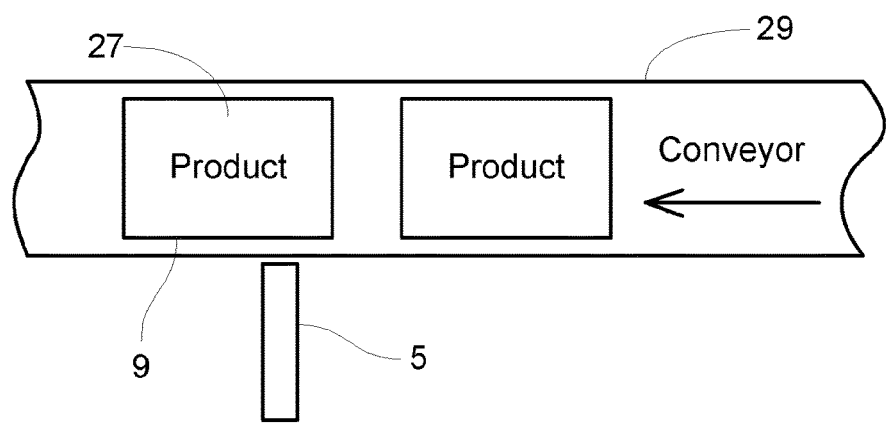
FIG. 4 is a schematic view from above of the print head in position to print onto objects carried past it on a conveyor.

FIG. 4 is a schematic plan view showing the print head 5 positioned to print onto the surfaces 9 of a plurality of product items or other objects 27 that are carried past the print head 1 by a conveyor 29, which carries the items 27 in the direction shown by the arrow. The conveyor is typically part of an industrial conveying line such as a product filling line or a product packaging line.

Figure 5:
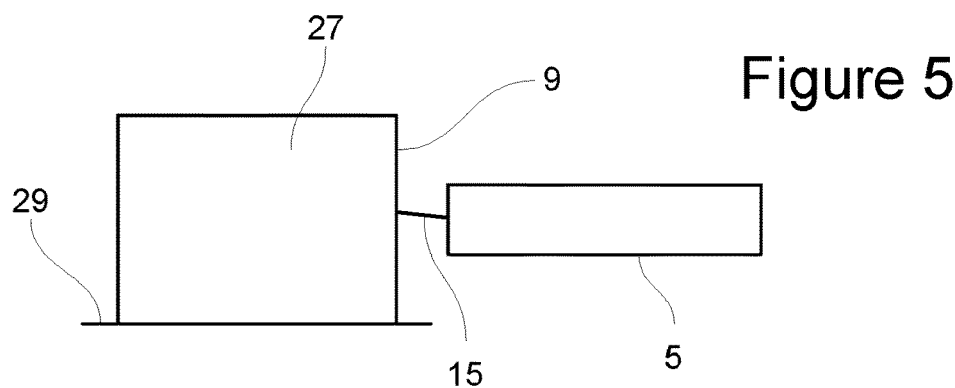
FIG. 5 is a schematic view of the print head, conveyor and an object on the conveyor, viewed in a direction along the conveyor.

FIG. 5 is a schematic end view, looking along the conveyer 29 in the opposite direction from the direction in which the product items 27 are carried by the conveyer 29.

Figure 6:
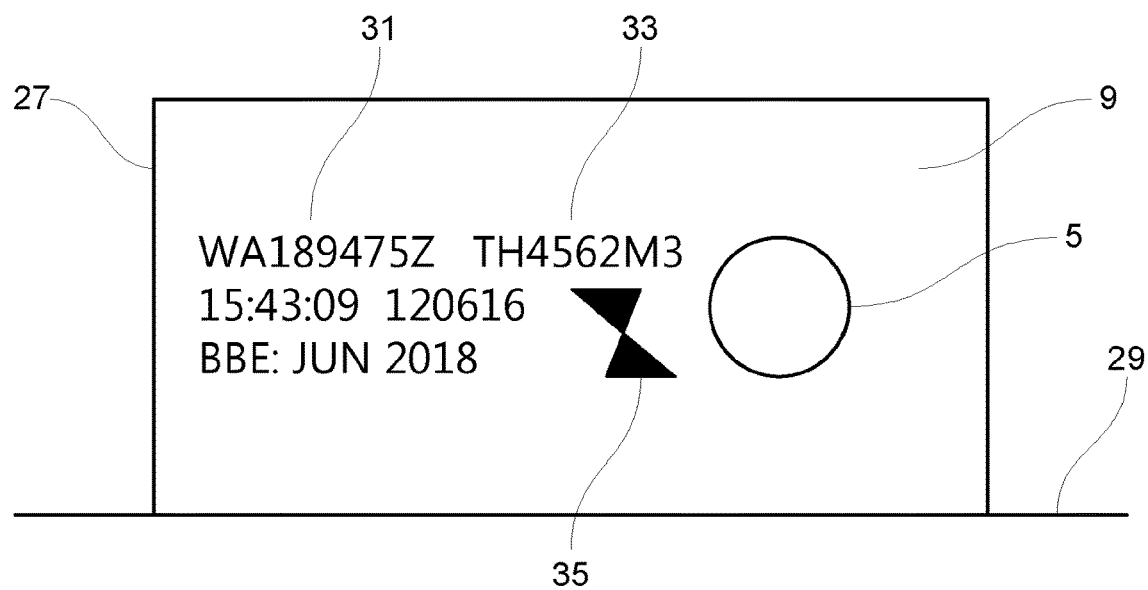
FIG. 6 is a schematic view of the print head, conveyor and an object that has been printed onto, viewed in a direction sideways of the conveyor.

FIG. 6 is a schematic side view showing a product item 27 and a print head 5. In FIG. 6, the printer has just finished printing onto the side surface 9 of the item 27 and the figure shows an example of the pattern or message that may be printed. For the sake of clarity, the pattern or message is shown are significantly larger in FIG. 6 than would actually be the case. The printed pattern in FIG. 6 shows examples of the various component parts that may be included in a pattern printed on an industrial product and the way that such parts may be laid out. In FIG. 6 the printed pattern includes a product code 31, that identifies the type of product, and a tracking code 33 that may for example indicate a batch number and the factory and product line where the printing operation took place. The second line of the printed pattern in FIG. 6 gives a time and date of printing. The third line of the printed pattern in FIG. 6 provides information that may be used by a retailer or consumer, such as a "best before end" indication as shown in FIG. 6. Additionally, the printer may print a graphic shape 35 if desired.

The print head 5 is connected to the main printer body 1 by the umbilical 7, which is not shown in FIGS. 4 to 6. As an alternative, it is possible to use a printer having a single body without a separate print head, in which case the entire printer at the position shown for the print head 5 in FIGS. 4 to 6.

In FIGS. 4 to 6, the printer is set up so that the surface 9 of the objects 27 onto which the printer prints is a side surface, and the ink jet 15 travels generally parallel to the surface of the conveyor 29 (although not exactly parallel owing to the deflection of the drops by the deflection electrodes 19, 21). However, it is also possible to set up the printer to print in a different direction. For example, if the printer is to print onto the film top of a food container immediately after the container has been filled and sealed, the printer may be positioned above the conveyor and arranged to print downwardly.

Although FIGS. 4 to 6 show the printer printing onto a succession of separate objects 27, the printer can also be used to print a pattern repeatedly onto a long continuous object such as a length of piping or electrical cable.

Figure 7:
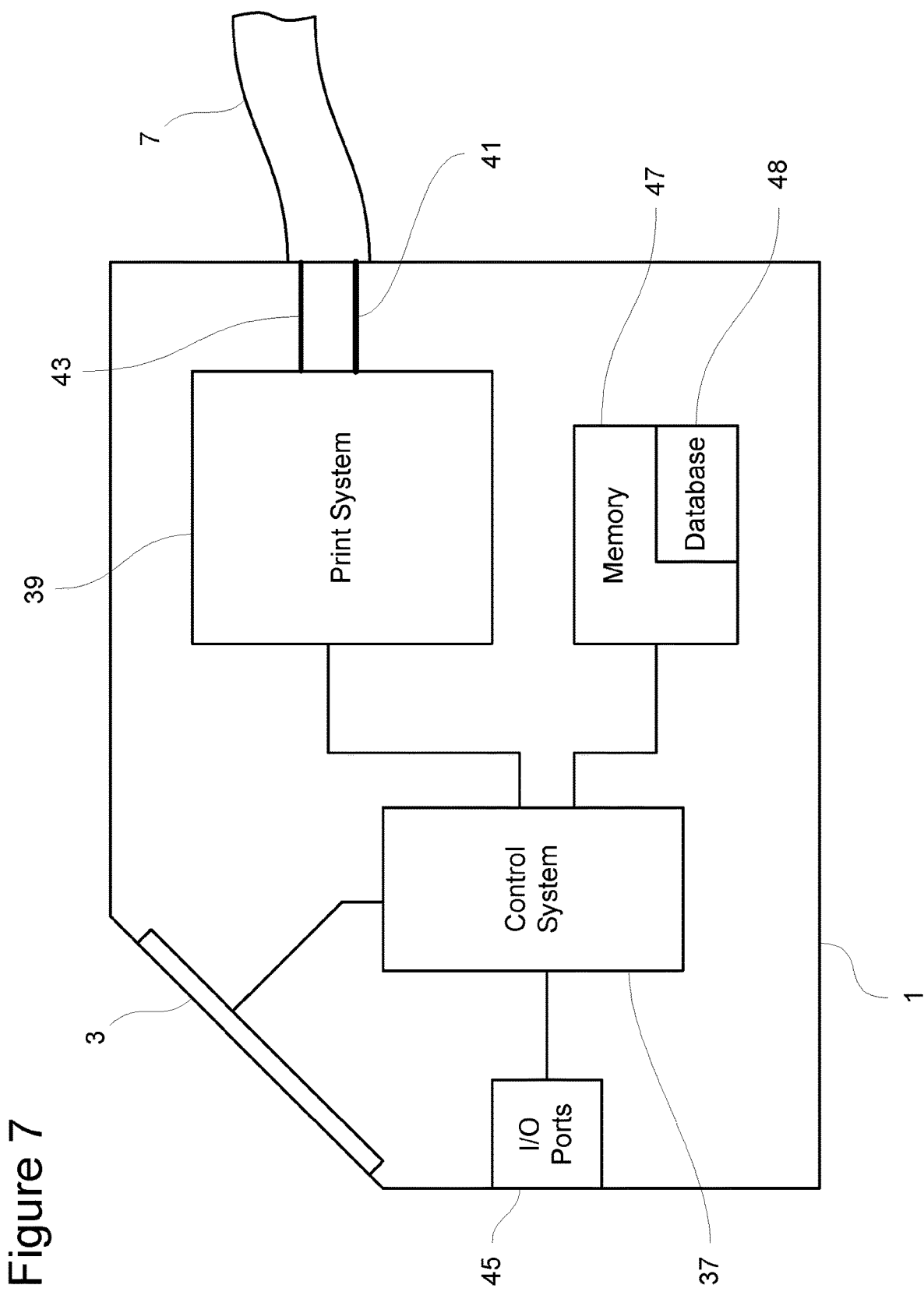
FIG. 7 shows components inside the main body of the printer of FIG. 1.

As shown in FIG. 7, the main printer body 1 includes a control system 37 for controlling the printer, and a print system 39 for performing print operations under the control of the control system 37. The print system 39 includes fluid handling components such as pumps, valves, ink and solvent tanks and associated fluid lines, and also electrical components for operating some of the fluid handling components and for providing electrical signals to other components such as the charge electrode 17 and the deflection electrodes 19, 21. Fluid lines 41 and electrical lines 43 extend from the print system 39 to the print head 5 through the umbilical 7. In practice, the print system 39 also includes some components in the print head 5, such as the ink gun 13, the charge electrode 17, the deflection electrodes 19, 21, the gutter 23 and possibly other components such as valves.

Input/output ports 45 allow the control system 37 to communicate with the outside world, and the control system 37 is connected to the touchscreen display 3 to allow it to communicate with an operator. Data, including data used to generate the pattern to be printed during operation of the printer, is stored in a memory 47.

During a print selection operation, carried out before a print run in which the patterns are printed onto a succession of objects 27 passing down the conveyor 29, the operator will input information via the touchscreen display 3 to enable the control system 37 to generate the correct printed pattern. Typically, the operator will provide an input that indicates what product the printer will be required to print onto, and the control system 37 will retrieve appropriate pattern information from a pattern information database 48 in the memory 47. This pattern information may specify both what is to be printed onto each item 27 of the product and also how the various parts within the printed pattern are to be laid out. Some of the data to be printed will not be provided directly by the identification of the particular product to be printed onto. In the example shown in FIG. 6, the product code 31 may be provided directly from the database 48 in accordance with which product is selected. The tracking code 33 will make use of factory and conveying line information which will be independent of the particular product selected but which may also be stored in the memory 47. Any batch number information included in the tracking code 33 may need to be input directly by the operator via the touchscreen display 3. The printing time and date will be taken from an internal clock and calendar in the printer. A "best before end" date may, for example, be calculated by the control system 37 from the printer's internal calendar in accordance with shelf life information stored in the database 48 as part of information relating to the product selected.

During a printing operation, the printer will normally be in a display mode in which information about the pattern being printed is shown on the touchscreen display 3. An example of such a display is shown in FIG. 8b. A "Now Printing" pane 49 tells the operator what product the printer is set up to print onto, the details of the message or pattern to be printed onto the product items, and the customer for the product items being printed onto during this particular print run. Additionally, a product image pane 51 shows an image of the product that the printer is set up to print onto. Other parts of the touchscreen display 3 show other information and controls that may be required or useful in the operation of the printer.

If the operator makes a mistake when setting up the printer, the printer may print the wrong pattern onto the objects 27 passing along the conveyer 29. This may result in incorrect information being printed onto the individual objects, such as a wrong product code or product description and possibly wrong shelf life dates such as "used by" or "best before".

If this happens, the product concerned may become unsaleable because of the incorrect printing and the operator of the industrial conveying line where the incorrect printing took place may have to pay for the loss incurred. This could include paying for the entire cost of the wrongly-printed items and even sometimes an additional penalty payment in addition to the cost of the wrongly-printed items. Accordingly, such mistakes can be very expensive.

In principle, the operator should be able to detect if a mistake has been made because the touchscreen display 3 displays the "Now Printing" pane 49 indicating how the printer has been set up to print. However, in practice such mistakes may be difficult to detect, especially for an inexperienced operator. In the present example, FIG. 8b shows information displayed on the touchscreen display 3 of the printer while FIG. 8a shows a product item 27 being carried past the printer on the conveyer 29. In this example, the printer has been set up wrongly. According to the "Now Printing" pane 49 on the printer, it is set up to print on a product described as "Orange Juice 1 litre Fresh/Chill". Looking at the product item shown in FIG. 8a, it is a carton labelled "Pure Orange Juice" and with a size marking of "1 litre". An inexperienced operator might not recognise that the shape of carton shown in FIG. 8a is typically used for heat treated juice rather than fresh chilled juice, and even an experienced operator might not notice the words "fresh/chill" in the "Now Printing" pane 49 that would indicate that the printer is set up for the wrong product. None of the other information in the "Now Printing" pane 49 would alert the operator to the error.

However, it is typically the case that different products have a significantly different appearance even if the products would have a similar written description. Additionally, although people are often not good at assimilating quickly and correctly all of the information provided to them in writing and interpreting it so as to determine instantly whether it applies to an object in front of them, people are often very good and fast at detecting a mismatch between an object and a picture of an object. In the present case, a product image pane 51 shows an image of the product that the printer is set up to print onto, and it is immediately apparent from comparing the image in the product image pane 51 with the actual product item shown in FIG. 8a that there is a mismatch and the printer is set up for the wrong product. In this way, the presence of the product image pane 51 on the touchscreen display 3 enables a much faster and more reliable detection of printer set-up errors by the operator.

A business that operates an industrial line with a printer for printing patterns onto products, such as a filling or packing line, may often be operating at different times on the same or similar products that are intended to be used in different ways or are to be delivered to different people or organisations. For example, a business may pack a variety of food and drink products that will be sold under different brand names and/or will be sold through different retailers. The marking required on the products may vary not only from product to product but also the marking on the same product may vary depending on how it will be used or who it will be delivered to. Large retail chains often have highly sophisticated internal systems for handling products, and require that the marking on products sold by them should conform to the requirements of their internal handling systems. Thus, referring to the example of a printed pattern in FIG. 6, the same product intended to be sold through different stores will often have to have different product codes 31 depending on the store, because the store will insist that its own internal codes are used. Also, different stores may have different rules concerning the layout of the marking in the overall printed pattern. For example, FIG. 6 shows the "best before end" date on the lowest of three lines of print. This may be required by one store whereas another store may require a different layout with that consumer information appears in the top line of print. Organisations such as large store chains, which handle very large quantities of goods, may find that incorrectly marked items are highly disruptive to their internal systems even when the items are otherwise acceptable. Consequently, such organisations typically impose contract conditions permitting them to reject batches containing incorrectly marked items. For this reason, it can be important for the business carrying out the printing to be able to detect promptly that a printer has been set up to print in accordance with the wrong intended use or intended recipient of the product, just as much as it is important to detect if the printer has been set up for the wrong product.

Similar or identical products may require different printing on them under other circumstances, such as when the products are intended for different markets or uses. For example, identical products intended to be sold in different countries may need to have text printed in different languages, and they may be subject to different regulations and therefore need to have different regulatory information to be printed on them. Identical products intended to be used in different circumstances (for example, electrical cables or building products that are suitable both for marine use and for use on land) may also be subject to different regulatory requirements depending on the intended circumstances of use, and so may need to have different compliance symbols and information printed on them. For convenience, the present application will refer to customers as a general term to cover all circumstances in which similar or identical products need to have different printing on them owing to a factor other than the nature of the product.

Figure 9:
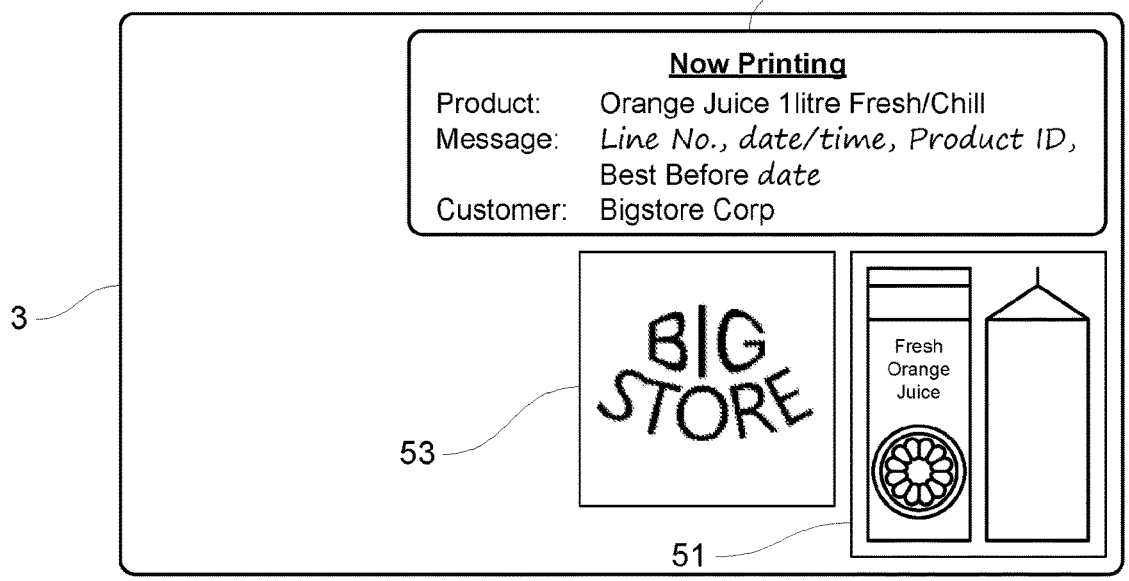
FIG. 9 shows an alternative to some of the display items of FIG. 8b.

FIG. 9 shows an alternative display of printing information on the touchscreen display 3, in which a displayed image is used to identify the intended customer or use, in order to facilitate the detection of this kind of error in the printer set up. In FIG. 9, the "Now Printing" pane 49 and the product image pane 51 on the touchscreen display 3 are accompanied by a customer image pane 53 which displays an image associated with the customer or use of the product according to the printer setup. Typically, the image in the customer image pane 53 will be a well-known logo or trade mark. Since different store chains typically have substantially different branding, an image displaying a logo or other brand mark will typically be highly recognisable to the operator of the printer. Provided that the operator knows the intended use or customer/destination of the product items 27 being carried on the conveyer 29, it will normally be immediately apparent to the operator from the image in the customer image pane 53 if the printer has been setup for the wrong use or customer/destination.

Other alternative ways of displaying images on the touchscreen 3 are possible. For example, there may be circumstances in which the chances of setting up the printer for the wrong product are very low and therefore the customer image pane 53 may be displayed without the product image pane 51. Additionally, the printer may have a mode in which it displays only one or both of the image panes 51, 53 while printing, and does not display the "Now Printing" pane.

In the discussion of FIGS. 8 and 9, the images have been displayed during printing so as to help the operator to identify if the items 27 on the conveyer 29 do not match the way in which the printer is set up. These images may also be used to assist the operator during an operation for setting up the printer before printing. Typically, the database 48 in the printer will store information used to determine what pattern to print on several different products, or on products for several different customers, and the operator will select the appropriate pattern information in accordance with instructions given to the operator concerning what product and customer (or use etc.) the printer should be set up for. After the operator has made this selection, the corresponding image can be displayed in the product image pane 51 or the customer image pane 53 or both. In this case, the information on the touchscreen display 3 can be similar to that shown in FIGS. 8a and 9, but the display is provided before the printing operation starts, so to enable the operator to verify that the correct selection has been made before printing starts.

Alternatively, the images can be used to assist the selection process. For example, if the database 48 stores message information for a large number of products, it may be convenient for the operator to select the correct product in a process which successively reduces the number of possible candidates in stages, rather than requiring the operator to select the correct product in a single step from the entire list of products covered by the data in the database 48. For example, the message information (or pointers to it) may be provided in a folder tree which the operator works through by a series of selections, or an automatic search facility may steadily reduce the number of possible matches as the operator enters more details of the product that is to be printed onto. The printer may be programmed so that at some point when the number of candidate products has been reduced to a manageable number, the printer either automatically or in response to an operator request displays images for two or more of the candidate products (if possible, an image for each remaining candidate product should be displayed), and the operator can select the correct product taking into account the displayed images.

Figure 10:
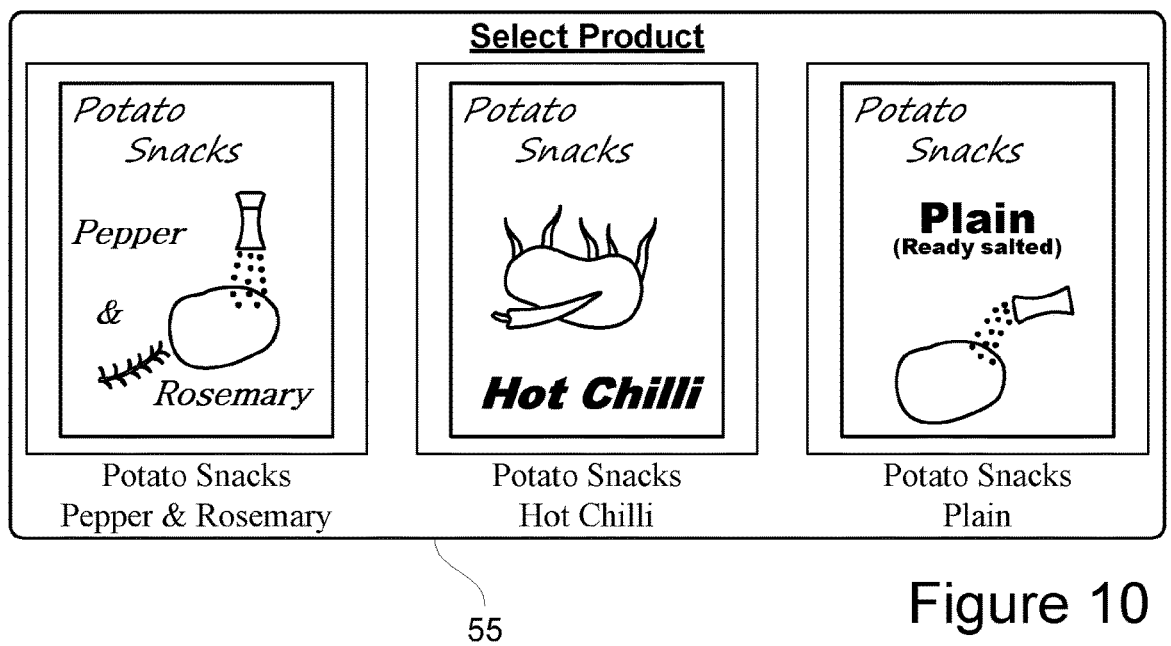
FIG. 10 shows a display pane used to select the product type to be printed onto.

For example, FIG. 10 shows a "Select Product" pane 55 that shows images for three candidate products side by side. Text descriptions of the products are also provided. In the example shown in FIG. 10, the operator has to choose between different flavours of the same snack product. In this example, the manufacturer has chosen to provide each flavour with distinctively different packaging, and accordingly the operator can readily distinguish between the different flavours because the images are noticeably different from each other. Additionally, although it is not possible to show in the drawings, manufacturers typically use different colours of packaging for different flavours of the same product, and the images displayed on the touchscreen display 3 are preferably in colour. Accordingly, this colour information also can be used by the operator to select the correct product provided that the operator knows what the correct appearance is (for example because the operator has been shown a sample of the product that will be placed on the conveyer 29). It will also be understood that colours in the images will also be useful to help the operator to notice if the items 27 being printed onto during a print operation do not match the product for which the printer is set up, as discussed above with reference to FIGS. 8 and 9.

Figure 11:
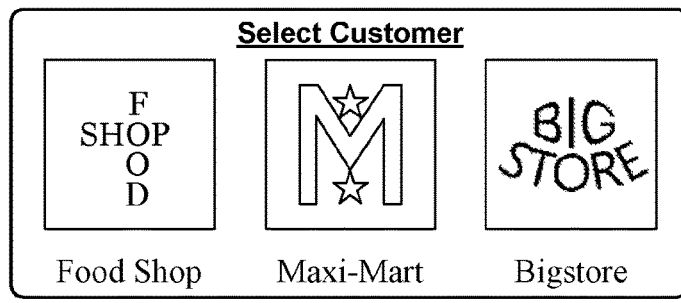
FIG. 11 shows a display pane used to select an intended customer or use of the product to be printed onto.

In a similar manner, customer logos or other brand images can be displayed to the operator in a "Select Customer" pane of the touchscreen display 3 at an appropriate time during the operation to set up the printer before printing, as shown in FIG. 11. As can be seen in FIG. 11, the logos or other customer branding will typically have a very different appearance for different customers, making it easy for the operator to select the correct customer quickly and accurately. Similarly, different intended uses can be indicated by suitable different images. For example, in the case of a product that can be used both in buildings and on boats, the different uses may be indicated by an image of a building and an image of a boat.

In order for the images to be displayed as appropriate on the touchscreen display 3 while the printer is printing or during an operation to set the printer up before printing, the stored images in the database 48 are associated with data that will be used to generate the pattern to be printed for the product or with the customer concerned. There are many ways in which this can be done. One way in which image data can be stored and used is shown in FIG. 12.

Figure 12:
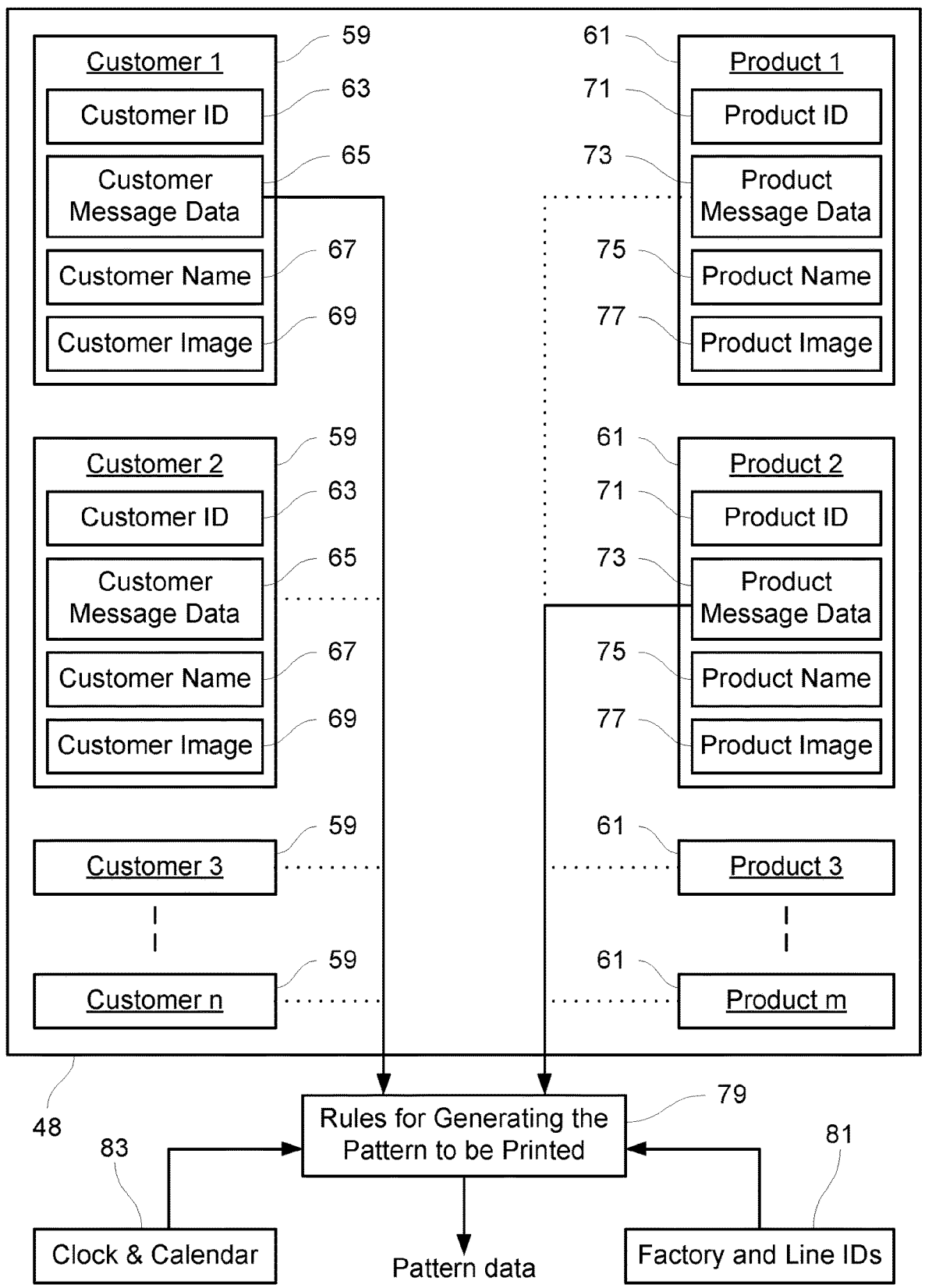
FIG. 12 shows schematically a way of storing data used for generating the patterns to be printed and the also storing the associated images.

In the arrangement of FIG. 12, the database 48 stores a customer data set 59 for each of a plurality of customers from customer 1 to customer n, and stores a product data set 61 for each of a plurality of products from product 1 to product m. Each customer data set 59 includes a data entry 63 containing a customer ID, a data entry 65 storing customer message data, a data entry 67 storing the customer name, and a data entry 69 storing a customer image. Similarly, each product data set 61 includes a data entry 71 for the product ID, a data entry 73 for product message data, a data entry 75 for the product name and a data entry 77 for a product image.

The operator can set the printer up for printing by identifying the product data set 61 and the customer data set 59 to be used. This can be done by a process of successively reducing the number of options or candidates as discussed above. Alternatively, if the operator is given the customer ID and the product ID, these can be entered through the touchscreen display 3 and the control system 37 is enabled to locate the correct data sets 59, 61 in the database 48. At any desired point during the set up operation or the printing operation, a customer image from the customer image data entry 69 of the selected customer data set 59 and/or a product image from the product image data entry 77 of the selected product data set 61 can be displayed on the touchscreen display 3. A set of rules 79 for generating the pattern to be printed uses the customer message data from the customer message data entry 65 and the product message data from the product message data entry 73 in the selected data sets 59, 61. In FIG. 12 customer 1 and product 2 have been selected. As discussed above, different customers may require the information included in the printed pattern to be laid out differently from each other, and the layout requirements for the selected customer will be included in the customer message data. The product message data may include, for example, shelf life information useable for calculating "sell by," "used by" dates etc. The rules 79 will typically use both the customer message data and the product message data to determine any product description or product code to be included in the printed pattern. As discussed above with reference to FIG. 6, the printed pattern will typically include traceability information such as identification codes for the factory and the individual line on which the printer is set up, and this traceability data 81 is also stored in the memory 47 (although not necessarily in the database 48). Additionally, the printer includes a clock and calendar function 83 (implemented by the control system 37 using data stored in the memory 47), and the time and date information from this clock and calendar function 83 is also used by the pattern generation rules 79 to provide printing time and date information to be included in the printed pattern and to calculate, based on the shelf life information from the product message data, any "sell by" or "used by" dates etc.

In FIG. 12, the database 48 stores a list of customer data sets 59 and a list of product data sets 61, and each image is stored in a data entry 69, 77 within the relevant data set 59, 61. The pattern generation rules 79 use both customer message data and product message data, stored in corresponding data entries 65, 73 in the relevant data sets 59, 61 in order to determine the pattern to be printed. However, there are alternative ways in which the image data and the data used for generating the pattern to be printed can be stored in the database 48.

Figure 13:
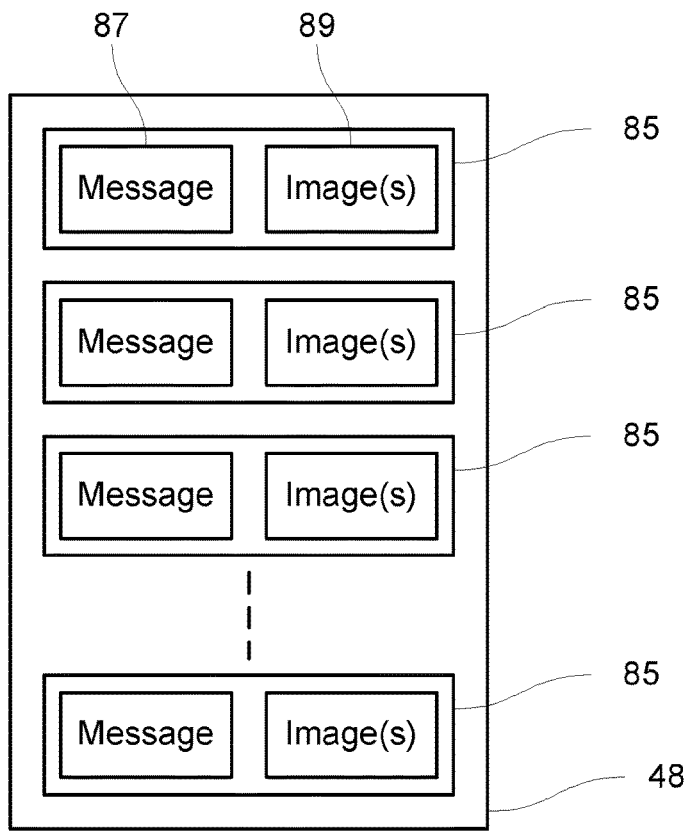
FIG. 13 shows another arrangement for storing message and image data.

FIG. 13 shows an arrangement in which the database 48 stores a single list of message data sets 85 and there is a separate message data set 85 for each combination of product and customer. Each message data set 85 includes a message data entry 87 containing data that specifies what should be included in the printed pattern and how it should be laid out for this particular product when the product is intended for a particular customer (or use etc.). If the same product might have a pattern printed onto it for multiple different customers, and multiple different types of product might all have patterns printed onto them for the same customer, the arrangement of data shown in FIG. 13 is likely to result in more message data sets 85 than the combined number of customer data sets 59 and product data sets 61 in FIG. 12. However, it is likely to be easier to specify how the printed pattern should be generated in the message data entry 87 FIG. 13, which is specific to a particular product when intended for a particular customer or use, as opposed to trying to set out the same requirements by a combination of the data in a customer message data entry 65 (which will be applied to all products intended for that customer or use) in combination with the contents of a product message data entry 73 (which will be applied to the relevant product regardless of the intended customer or use). In FIG. 13, at least some of the message data sets 85 include an image data entry 89, providing data for one or more images that are associated with the particular product and customer of that message data set 85. The image data entry 89 in FIG. 13 may specify both (a) one or more images of the product concerned and (b) one or more images for identifying the intended customer or use.

In both FIG. 12 and FIG. 13, the image data is stored in the same data entry as the message data that it is associated with. However, this is not necessary. In the data storage arrangement shown in FIG. 14, each message data set 85 is specific to a particular combination of a product and customer, in the same way as in FIG. 13, and includes a message data entry 87 specifying how to generate the pattern to be printed for this particular combination of product and customer. However, in FIG. 14 at least some message data sets 85 include a product image data entry 77, as would be included in the corresponding product data set 61 of FIG. 12, and a customer identity data entry 63 rather than a customer image data entry 69. The memory 47 also stores a series of customer image data sets 91, at least some of which include a customer identity data entry 63 and a customer image data entry 69.

Figure 14:
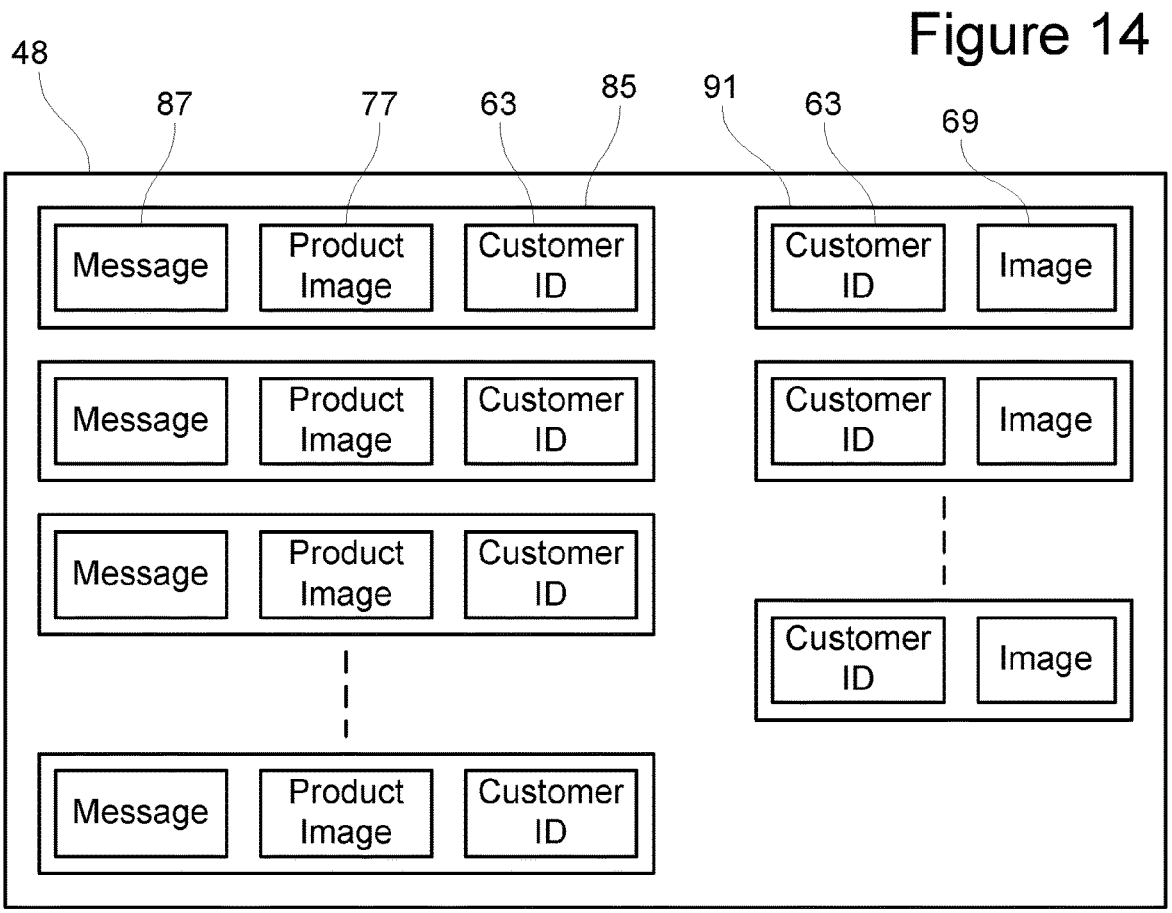
FIG. 14 shows a further arrangement for storing message and image data.

If a particular message data set 85 is selected in FIG. 14, the corresponding product image can be displayed using the product image data entry 77 in the selected message data set 85, and the corresponding customer image can be displayed by referring to the customer identity data in the customer identity data entry 63 in the selected message data set 85, and then using that data to locate the appropriate customer image data set 91 and retrieve the customer image data entry 69 from that customer image data set 91. Accordingly, the customer image is still associated with the message data, but is stored separately from it. It will commonly be the case that the same customer or use will be associated with a large number of different products. In the arrangement of FIG. 13, the corresponding customer image data will be stored separately in the message data set 85 for each combination of a product with that particular customer image. In the arrangement of FIG. 14, the customer image data only has to be stored once, in the customer image data entry 69 in the relevant customer image data set 91, and each message data set 85 with which that image is associated contains only the customer identity data entry 63 rather than the customer image data entry 69. Since the customer image data is likely to be very much larger than the customer identity data, FIG. 14 can allow a substantial saving of space in the memory 47 by avoiding the need to store many duplicates of the same customer image data.

In FIG. 14, the product image data is stored in product image data entries 77 in the respective message data sets 85, and only customer image data is stored in customer image data entries 69 in separate customer image data sets 91. However, as shown in FIG. 15, it is also possible to provide separate product image data sets 93, so that at least some of the message data sets 85 include a customer identity data entry 63 and a product identity data entry 71, which serve to identify the relevant customer image data set 91 and product image data set 93, and the message data set 85 does not itself include any image data entry.

In the preceding discussion, the data used to generate the pattern to be printed is associated with both a customer image and a product image, but it is also possible that in some or all cases as this data is associated only with a product image or only with a customer image.

Figure 15:
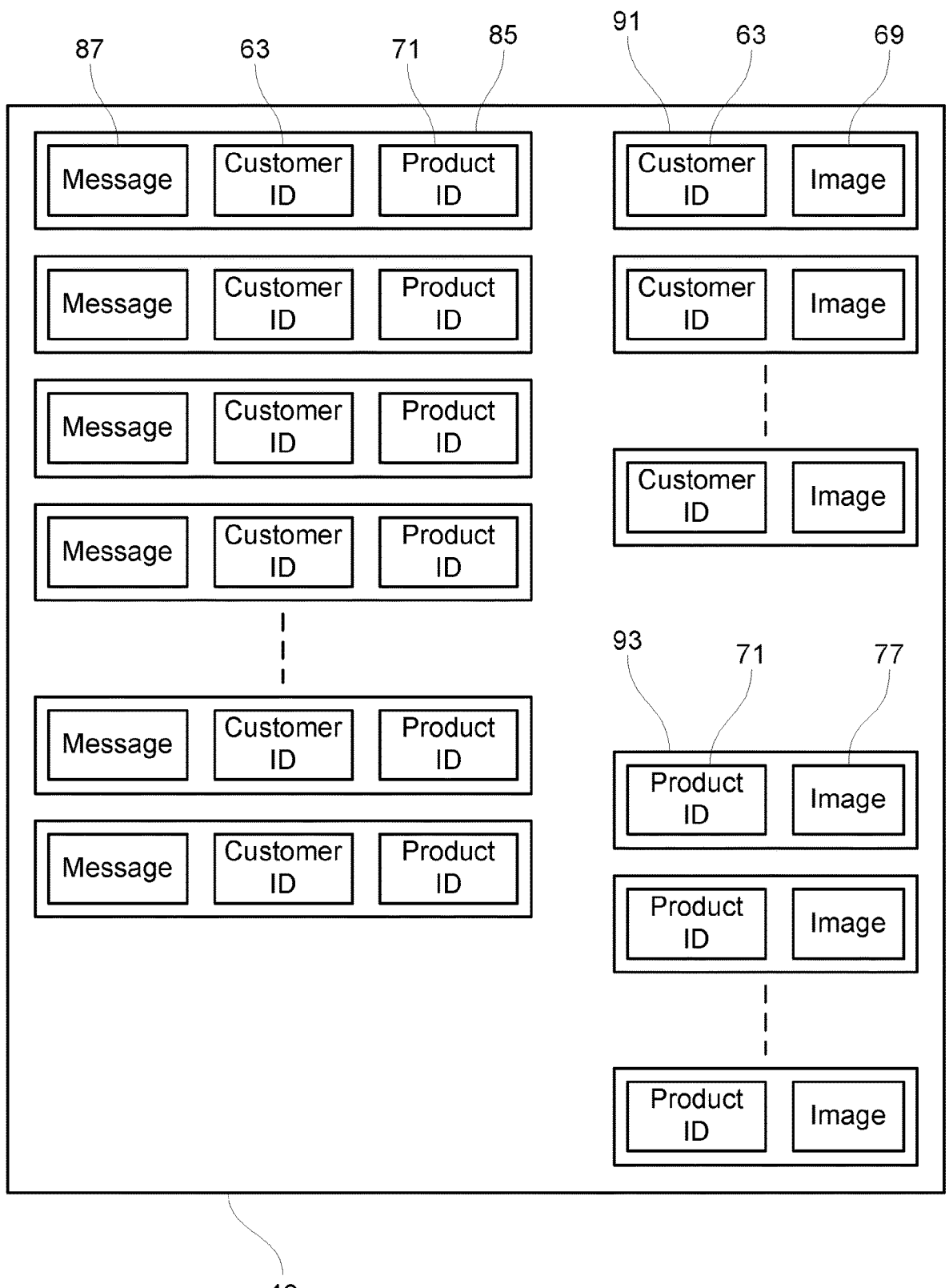
FIG. 15 shows a yet further arrangement for storing message and image data.

In the discussion of FIG. 12 the data entries 65 are referred to as storing customer message data and the data entries 73 are referred to as storing product message data, and in the discussion of FIGS. 13 to 15 the data sets 85 are referred to as a message data sets and the data entries 87 are referred to as a message data entries, because the printed pattern is usually made up wholly or mostly of alphanumeric characters and can be regarded as a message. However, such a message is simply an example of the printed pattern. These data entries 65, 73, 87 are examples of pattern data entries and the message data set 85 can be regarded as a pattern data set.

In use of the printer, the various data sets will normally have been prepared and written into the database 48 in advance of the operations to select and print the pattern. The data sets can be created and checked rigorously on a computer or other device separate from the printer, and only transferred to the memory 47 of the printer after it has been verified that the contents of every message data entry is correct and works properly with the pattern generation rules 79 to result in the correct printed pattern on the objects 27. After completion of all checking, the data may be written into the memory 47 by connecting a data storage device, containing the data, to the printer via the input/output ports 45. The images can be obtained from any convenient source. The images may be photographs, especially in the case of the product images, and the printer may include a camera (e.g. on the print head 5) for photographing sample objects.

Figure 16:
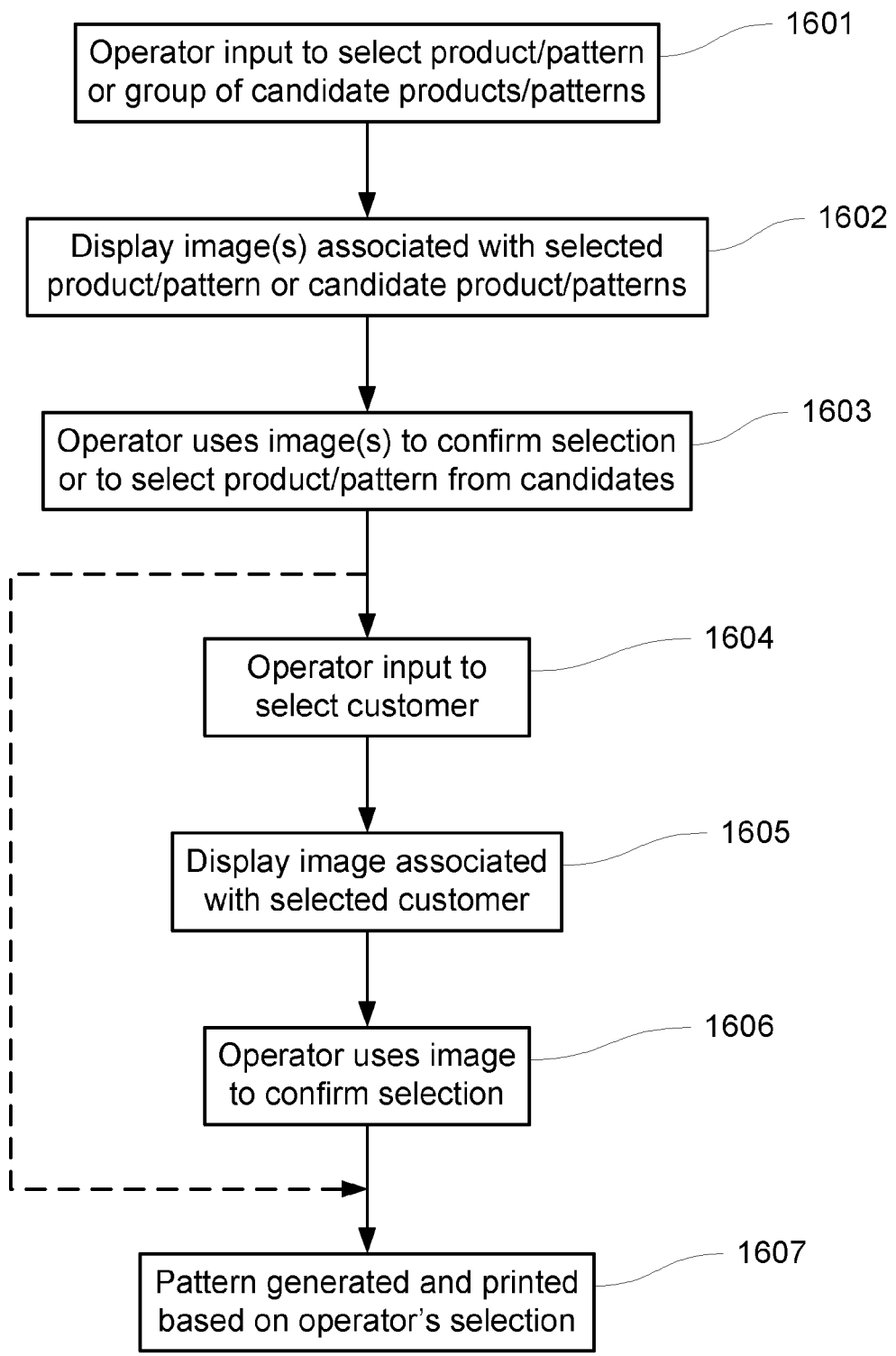
FIG. 16 is a flow diagram for the process of selecting the pattern to be printed.

FIG. 16 is a flow diagram showing how the stored data from one of FIGS. 12 to 15 may be used during an operation to set up the printer for printing the patterns onto items 27 of a particular product. In this context, an item is an individual object and a plurality of items are all of the same product if they are all identical. In step 1601 the operator provides an input or a series of inputs through the touchscreen display 3 in order to identify the product. Depending on how the data is stored in the database 48, there are many different ways in which this could be done. For example, the product could be identified directly if the operator inputs an appropriate product identity code. Alternatively, the information relating to a product stored in a product data set 61 or a message data set 85 might include category information, or the individual data sets might be stored in multiple folders or directories organised hierarchy so that the operator can first identify a product category, and subsequently a subcategory and so on until the specific product is identified or there are only a small number of candidates remaining. As a further alternative, the product data set 61 or the message data set 85 may include the product name as a text string, and searching software may be used to identify possible matches in the stored data as the operator inputs the product name as text.

Once the individual product has been identified, or only a small number of candidates remain, the product image or images associated with the selected product or each candidate product, if available, is displayed on the touchscreen display 3 in step 1602. If the operator knows what the correct product looks like, or has been provided with a sample item of the product, the displayed image or images can be used to select the correct product amongst the candidates or confirm the correctness of a selection that has already taken place. The operator can provide a selection or confirmation input for example by touching the relevant image on the touchscreen display 3, in step 1603. Information about the pattern to be printed, including the text of any fixed wording, may optionally be displayed in addition to the image or images.

If the database 48 in the memory 47 is organised as shown in any of FIGS. 13 to 15, the process of steps 1601 to 1603 may result in the selection of an individual message data set 85 that is specific both to the product type and the intended customer or use, and the image or images displayed in step 1602 may include one or more customer images.

Where the database 48 is organised as shown in FIG. 12 or FIG. 15, the operator can enter the product identity code and the customer identity code, which could be used as search keys to identify the corresponding customer data set 59 and the corresponding product data set 61 (in the case of FIG. 12) or to identify the corresponding message data set 85 (in the case of FIG. 15). Where the database 48 is organised as shown in FIG. 15 the product identity code and the customer identity code can also be used (possibly at the same time) as search keys to locate the corresponding customer image data set 91 and/or product image data set 93.

It is also possible, with the data structures of FIG. 12 and FIG. 15, for only the product identity to be entered in step 1601, with a corresponding product image displayed in step 1602 and selected in step 1603, so that by the end of step 1603 only the relevant product data set 61 has been identified (in the case of FIG. 12) and the relevant customer data set 59 has not been identified, or (in the case of FIG. 15) the required message data set 85 may not have been uniquely identified if there are multiple message data sets 85 having the same product identity data in the product ID data entry 71 but different customer identity data in the customer identity data entry 63.

If there are multiple possible customers or intended uses for the product, and the customer or use has not been identified by the end of step 1603, the operator can make a further operator input in step 1604 to select the customer. In response to this input, the image or images associated with the selected customer, if available, can be displayed in step 1605 and the operator can use that image to confirm in step 1606 that the correct customer has been identified. Following step 1606, the printer has been provided with all information necessary in order to print the correct pattern onto each product item 27, and accordingly the printer is set up for printing. Subsequently, as objects 27 pass the print head 5, the appropriate pattern is generated and is printed onto the objects 27 in step 1607.

As shown in a broken line in FIG. 16, if customer selection is not necessary or has already been performed by the end of step 1603, the process can jump directly from step 1603 to step 1607, omitting steps 1604, 1605 and 1606.

Figure 17:
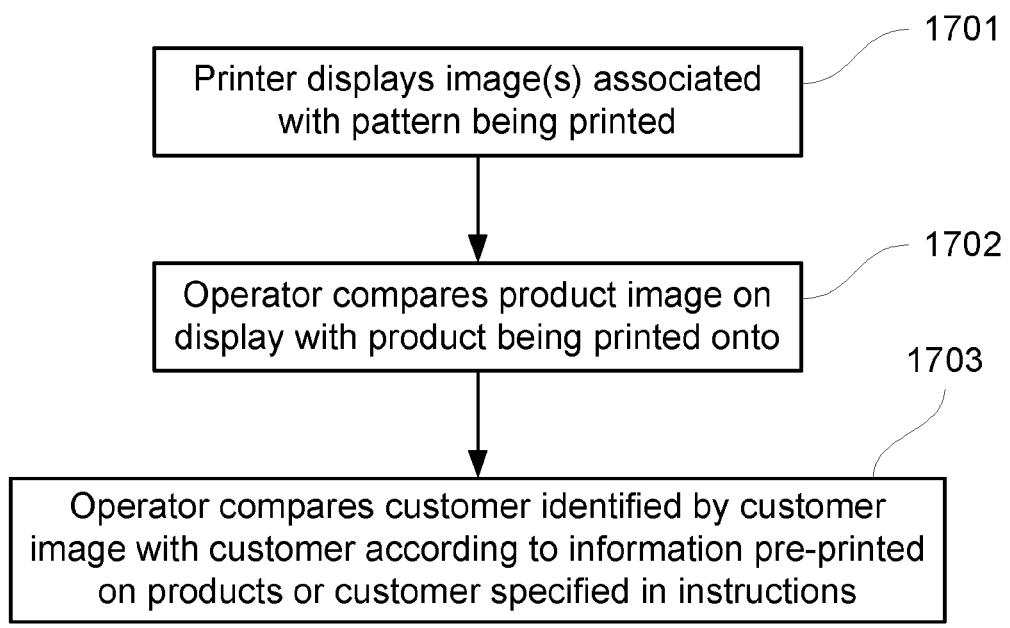
FIG. 17 is a flow diagram for the use of image data during printing.

FIG. 17 is a flow diagram showing a way in which of the stored image data can be used during a printing operation to enable verification that the correct pattern is being printed onto the objects 27. In step 1701, the printer displays, during a printing operation, one or more product images and/or one or more customer images associated with the pattern or patterns being printed onto the objects 27. In step 1702, the operator looks at the objects 27 that are being carried past the print head 5 on the conveyor 29, and are being printed onto. The operator compares the appearance of these objects 27 with any product image displayed on the touchscreen display 3 of the printer. Additionally, the operator may have been informed of the intended customer or use, or the objects 27 may already have packaging or other marking on them that includes an identification of the customer or intended use. In this case, the operator can compare this customer or intended use with the customer or intended use indicated by any customer image displayed on the touchscreen display 3, in step 1703.

If the result of the comparisons in steps 1702 and 1703 is that the product and customer or intended use matches the image or images displayed on the touchscreen display 3, the operator need not take any action. However, if the operator identifies a mismatch he can then take immediate action to halt the printing operation in order to minimise the number of items 27 that have the wrong pattern printed onto them, and then change the way in which the printer is set up in order to print the correct pattern in future.

Such action by the operator, to identify and interrupt incorrect printing, both minimises the number of objects 27 that have the wrong pattern printed onto them, and also enables the error to be detected and corrected while the objects 27 are still on site. This allows the business operating the conveyor 29 and the printer to avoid dispatching items to a customer or user with the wrong pattern printed on them, thereby avoiding any fine or penalty charge that would otherwise be incurred.

Although in principle the operator can select the correct data for printing and can detect any errors in the selection by checking a display of message text and other data relating to the pattern to be printed on the objects 27, operators will normally find it easier, quicker and more reliable to make such selections and detect such errors by the use of displayed images.

The embodiments described above and shown in the accompanying drawings are provided by way of non-limiting example, and various alternative arrangements will be apparent to those skilled in the art. The printer does not have to be a continuous ink jet printer. It may be a drop-on-demand ink jet printer. It may be a laser marker.

The invention claimed is:

1. A printer having a print head operable to print a predefined pattern onto an object that is carried on a product conveying line, the printer further comprising a display, a user input device, and a memory storing a plurality of pattern data entries each defining, alone or in combination with further data, the pattern to be printed onto an object, the memory further storing a plurality of images, wherein at least some of said pattern data entries are first pattern data entries and each respective one of said first pattern data entries is associated in the memory with at least one said image that is not an image of a pattern, defined at least in part by the respective one of the first pattern data entries, to be printed onto an object or of a part of a pattern, defined at least in part by the respective one of the first pattern data entries, to be printed onto an object, and the printer has a print selection mode of operation in which the user is able to select from the memory one of said pattern data entries to define at least in part a pattern to be printed by the printer during a subsequent print operation, and (i) in the case that the selected pattern data entry is one of said first pattern data entries, at least one image with which the selected pattern data entry is associated in the memory and which is not an image of a pattern to be printed by the printer during said subsequent print operation or of a part of a pattern to be printed by the printer during said subsequent print operation, is displayed on the said display following selection of the pattern data entry by the user, and/or (ii) in the case that the user is able to select the pattern data entry from a plurality of candidate pattern data entries at least some of which are first pattern data entries, at least one image with which a candidate pattern data entry is associated in the memory and which is not an image of a pattern to be printed by the printer during said subsequent print operation or of a part of a pattern to be printed by the printer during said subsequent print operation if the candidate pattern data entry is selected, is displayed on the said display during the print selection mode of operation prior to the selection by the user.

2. The printer according to claim 1 in which a said first pattern data entry is associated in the memory with an image that is a picture of an object onto which a pattern, defined at least in part by the pattern data entry with which the image is associated in the memory, may be printed.

3. The printer according to claim 2 in which the image is a photograph.

4. The printer according to claim 1 in which a said first pattern data entry is associated in the memory with an image that is a graphic symbol or a picture that represents an intended customer, an intended user or an intended use of the object onto which a pattern, defined at least in part by the pattern data entry with which the image is associated in the memory, may be printed.

5. The printer according to claim 1 in which a plurality of said first pattern data entries are associated in the memory with the same image.

6. The printer according to claim 1 in which the user input device comprises a touchscreen function of the display.

7. A printer having a print head operable to print a predefined pattern onto an object that is carried on a product conveying line, the printer further comprising a display, a user input device, and a memory storing a plurality of pattern data entries each defining, alone or in combination with further data, the pattern to be printed onto an object, the memory further storing a plurality of images, wherein at least some of said pattern data entries are first pattern data entries and each respective one of said first pattern data entries is associated in the memory with at least one said image that is not an image of a pattern, defined at least in part by the respective one of the first pattern data entries, to be printed onto an object or of a part of a pattern, defined at least in part by the respective one of the first pattern data entries, to be printed onto an object, and the printer has a printing mode of operation in which the printer repeatedly performs a print sequence in which it prints a predefined pattern onto an object, the predefined pattern printed in each said print sequence being defined at least in part by a common said first pattern data entry, and in which an image with which the common said first pattern data entry is associated in the memory and that is not an image of a pattern that is printed onto an object during each said print sequence or of a part of a pattern to be printed onto an object during each said print sequence is displayed on the said display during the printing mode of operation.

8. The printer according to claim 7 in which a said first pattern data entry is associated in the memory with an image that is a picture of an object onto which a pattern, defined at least in part by the pattern data entry with which the image is associated in the memory, may be printed.

9. The printer according to claim 8 in which the image is a photograph.

10. The printer according to claim 7 in which a said first pattern data entry is associated in the memory with an image that is a graphic symbol or a picture that represents an intended customer, an intended user or an intended use of the object onto which a pattern, defined at least in part by the pattern data entry with which the image is associated in the memory, may be printed.

11. The printer according to claim 7 in which a plurality of said first pattern data entries are associated in the memory with the same image.

12. The printer according to claim 7 in which the user input device comprises a touchscreen function of the display.

13. A printer having a database, a display screen, a print system and a control system, the database storing a plurality of pattern data entries that define, at least in part, a pattern to be printed by the print system and the database additionally storing, in respect of at least some of said pattern data entries, an image associated with the pattern data entry, the image not being an image of a pattern, defined at least in part by the pattern data entry with which the image is associated, to be printed onto an object or of a part of a pattern, defined at least in part by the pattern data entry with which the image is associated, to be printed onto an object, and the control system responding to one of:
(a) a print operation in which the print system prints a pattern defined at least in part by a selected one of said pattern data entries,
(b) a selection input that selects from the database one of said pattern data entries for use in defining the pattern to be printed by the print system, and
(c) a selection input that selects from the database one of said pattern data entries in a context permitting the selected pattern data entry to be chosen for defining at least in part the pattern to be printed by the print system,
by displaying on the display screen an image stored in the database in association with the selected pattern data entry.

14. The printer according to claim 13 in which the image is a picture of an object onto which a pattern, defined at least in part by the selected pattern data entry, may be printed.

15. The printer according to claim 14 in which the image is a photograph.

16. The printer according to claim 13 in which the image is a graphic symbol or a picture that represents an intended customer, an intended user or an intended use of the object onto which a pattern, defined at least in part by the pattern data entry associated with the image, may be printed.

17. The printer according to claim 13 in which the same image is associated with a plurality of said pattern data entries.

18. A method of printing comprising
a step of selecting a pattern data entry stored in a database in a printer, the pattern data entry comprising data defining, at least in part, a pattern to be printed by the printer onto an object, and
a step of the printer printing a pattern defined at least in part by the data of the selected pattern data entry,
the method further comprising the printer displaying, during at least one of said selecting step and said printing step, an image stored in the database of the printer, the said image being associated in the database with the selected pattern data entry and not being an image of said pattern printed in the printing step or of a part of said pattern printed in the printing step.

19. The method according to claim 18 in which the image is a picture of an object onto which the printer may print a pattern defined at least in part by the selected pattern data entry.

20. The method according to claim 19 in which the image is a photograph.

21. The method according to claim 18 in which the image is a graphic symbol or a picture that represents an intended customer, an intended user or an intended use of the object onto which the printer may print a pattern defined at least in part by the pattern data entry associated in the database with the image.

22. The method according to claim 18 in which the same image is associated in the database with a plurality of said pattern data entries.

* * * * *